(12) United States Patent
Batten et al.

(10) Patent No.: US 6,435,078 B1
(45) Date of Patent: Aug. 20, 2002

(54) COOKING APPARATUS WITH GREASE REMOVAL SYSTEM

(75) Inventors: William C. Batten; Bruce W. Kyles, both of Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 0 days.

(21) Appl. No.: 09/711,200

(22) Filed: Nov. 14, 2000

Related U.S. Application Data

(60) Division of application No. 09/439,541, filed on Nov. 12, 1999, now Pat. No. 6,213,002, and a continuation of application No. 09/439,542, filed on Nov. 12, 1999, now Pat. No. 6,261,462.
(60) Provisional application No. 60/135,033, filed on May 20, 1999.

(51) Int. Cl.⁷ .................................................. A47J 27/00
(52) U.S. Cl. ............................. 99/446; 99/400; 99/473; 99/340
(58) Field of Search .......................... 99/473, 472, 474, 99/476, 467, 330, 400, 444, 446, 375, 477; 126/19 R, 20, 21 R, 273 R, 275 R, 369

(56) References Cited

U.S. PATENT DOCUMENTS

| | | | |
|---|---|---|---|
| 2,097,793 A | 11/1937 | Howell | 126/41 |
| 3,604,895 A | 9/1971 | MacKay | 126/369 |
| 3,744,474 A | 7/1973 | Shaw | 126/20 |
| 4,084,492 A | 4/1978 | Sullivan | 99/330 |
| 4,189,995 A * | 2/1980 | Lohr et al. | 99/473 X |
| 4,506,598 A | 3/1985 | Meister | 99/330 |
| 4,646,630 A | 3/1987 | McCoy et al. | 99/474 |
| 4,876,426 A | 10/1989 | Smith | 219/10.55 |
| 4,920,948 A | 5/1990 | Koether et al. | 126/21 |
| 4,924,072 A | 5/1990 | Oslin | 219/401 |
| 5,083,505 A | 1/1992 | Kohlstrung et al. | 99/331 |
| 5,101,714 A | 4/1992 | Grandi | 99/335 |
| 5,184,540 A | 2/1993 | Riccio | 99/421 |
| 5,191,831 A | 3/1993 | Walden | 99/446 |
| 5,494,690 A * | 2/1996 | Shelton | 99/474 X |
| 5,584,236 A | 12/1996 | Margolis | 99/425 |
| 6,019,894 A * | 2/2000 | Batten | 44/446 X |
| 6,152,024 A * | 11/2000 | Tippmann | 99/472 |
| 6,261,462 B1 * | 7/2001 | Batten | 99/375 X |

* cited by examiner

Primary Examiner—Reginald L. Alexander

(57) ABSTRACT

An integrated system including an oven and a separator for converting a grease/water mixture exiting the oven into a grease component and a gray water component is disclosed. The oven, which may be considered to be independent of the integrated system, includes a reservoir that acts as a water vapor source and a drip pan for capturing the juice and/or grease that exude from a food stuff as it cooks. A water supply line in fluid communication with reservoir provide for clearing the surface of the reservoir of grease slicks or a grease layer that might interfere with the humidity or water vapor content of the oven. A controller may be provided to regulate the frequency and duration of the clearing of the reservoir surface.

25 Claims, 3 Drawing Sheets

COOKING APPARATUS WITH GREASE REMOVAL SYSTEM

This application is a division of utility application No. 09/439,541, filed Nov. 12, 1999 and now is U.S. Pat. No. 6,213,002. This application is also a continuation of U.S. Pat. No. 6,261,462 filed as application Ser. No. 09/439,542 on Nov. 12, 1999, which was based on provisional application No. 60/135,033, filed May 20, 1999.

BACKGROUND OF THE INVENTION

This invention pertains to cooking equipment that uses water to either assist with cooking or as the main cooking medium. The cooking equipment which includes ovens commonly called "rotisserie" ovens used in supermarkets to prepare quantities of food, includes components for the removal of grease that might otherwise interfere with the use of the water in the cooking equipment. The invention also pertains to a method for removing the grease.

Cooking equipment that uses water to either assist with cooking or as the main cooking medium typically includes a reservoir to contain the water within the equipment. In some cooking equipment. this reservoir resides within the bottom of the equipment to create a large surface of water from which water vapor is readily formed and/or to function as a drip pan. In cooking operations that deal with foodstuffs comprising or to which fats, oils or grease are added, as grease falls from the food stuff, a grease/water mixture results. Grease segregates from the water because of its immiscibility and floats to the surface of water because of its lower specific gravity or density to form slicks on the surface of the water in the reservoir. As the number and size of slicks increases, the quantity of water/vapor interfacial area decreases, which in turn can decrease the volume of water vapor in the equipment. When a grease film forms substantially over the entire surface of the water, rather than evaporating directly to water vapor, water must first diffuse through the grease film to sustain the water vapor within the equipment. However, it appears that rate of water diffusion through grease is insufficient to sustain the volume of water vapor in the equipment, thus the humidity or water vapor content in the equipment drops to unacceptable levels. There is a need for a solution to this problem.

In addition, the grease/water mixture, once drained form the cooking equipment can be problematic if disposed directly into a sewer line since the grease/water mixture burdens municipal sewer systems. In fact, municipal authorities surcharge businesses discharging grease/water mixtures directly into sewer lines connected to the municipal systems. The present invention may also be used to relieve the sewer rate surcharges by diverting the grease component from a grease/water mixture to dispose only a gray water into the municipal sewer line.

It is known to separate grease from water in cooking equipment using specific gravity or density differences between the grease and the water. Although such systems appear to be effective in separating grease from the water. they lack in their ability to maintain a constant humidity.

U.S. Pat. No. 2,097,793 discloses cooking by broiling. A device having a shallow vessel D with a tubular member 16 passing through the bottom of the shallow vessel D and ending a short distance below the bottom of the shallow vessel D is disclosed. The upper end of the tubular member 16 is preferably expanded to form a hollow cone. A drain hole by which the shallow vessel D may be drained, having plug 23 with a draw chain 21 is provided in the bottom of the shallow vessel D. A catch vessel F is placed underneath the lower end of the tubular member 16. The shallow vessel D is partly filled with water until the level is near that of the upper end of the tubular member 16. As heat drives greases and juices from an object being cooked S, grease fills into the shallow vessel D and floats on the water, forming a thin layer 26. This thin layer of grease 26 runs over the upper edge of the cone to be caught in the catch vessel F. No considerable accumulation of grease is possible as it continually drains from the shallow vessel D through the tubular member 16 into the catch vessel F.

U.S. Pat. No. 4,506,593 discloses an apparatus for the heating of food stuffs by means of a steam-air mixture as a heating medium. The apparatus has a device beneath the cooking space for draining of the condensate and food juices or fat out of the cooking space. In a first position, the device discharges water and condensate out of the cooking space through a discharge pipe into a siphon. In a second position, the device directs fat and food components into a fat collection pan. By these two positions, the device ensures that no fat or food components can run from the cooking space into the siphon.

U.S. Pat. No. 4,924,072 discloses an oven for food convection cooking with superheated steam, saturated steam, or hot air. The oven incorporates a microprocessor to control temperature, cooking time and oven humidity.

U.S. Pat. No. 5,101,714 discloses a cooking unit that uses liquids such as oil or water for cooking. After use, the liquids are collected on an inclined plane for recycling through filters to regenerate the liquids for another cooking cycle.

U.S. Pat. No. 5,184,540 discloses a cooking apparatus that may include a reduction trap disposed beneath a spit to recover the juices produced when cooking food on the spit. Details of the trap include a food juice drain at an elevation above a water level so that juices may be drained off the water.

U.S. Pat. No. 5,584,236 discloses a device for fat removal that permits the separation of a cooked meat from the liquid medium used for cooking. The separation of fat that has floated to the top of a broth is described.

It is very apparent that there is a need to provide a system that continuously removes grease from the surface of a water reservoir and that overcomes the above problems of the prior art. More specifically, there is a need for a system that continuously maintains a consistent humidity or water vapor content. It is also apparent that there is a need for a system that separates the grease component, which is latter appropriately disposed, from the gray water component, which is disposed into a drain or a sewer.

SUMMARY OF THE INVENTION

The present invention satisfies the need for an integrated system that not only provides a consistent humidity or water vapor content within an atmosphere of an oven but also provides for the separation or segregation of a grease component from a gray water component prior to discharging the grease/water mixture from the oven into drain or sewer line. The integrated system includes an oven containing a water reservoir in fluid communication with an overflow or surface drain. The present invention also satisfies the need for an oven that provides a consistent humidity or water vapor content within its atmosphere. The oven contains a water reservoir in fluid communication with an overflow or surface drain. A water supply is in fluid communication with the water reservoir, preferably, in such a manner that facilitates regulated and/or disciplined supply (e.g., initial providing and subsequent replenishing) of water to the water reservoir.

At the start of a cooking operation, the empty water reservoir is filled with water. Upon heating, the water evaporates, supplying humidity or water vapor to the atmosphere within the oven. A foodstuff, such as, for example, a meat, might at this stage be placed into the oven. As cooking starts and then proceeds, juices and/or grease exuding from the foodstuff fall into the water to initially form slicks of grease on the surface of the water reservoir. In time, the number and/or size of the slicks grows to such an extent and, possibly, into a layer, to substantially cover the surface of the water reservoir, hindering the contacting communication of the water surface with the atmosphere of the oven. This, in turn, may decrease the humidity or water vapor content in the atmosphere of the oven. To reestablish a substantially grease free surface, water is introduced into the water reservoir through a water supply line in a regulated and/or disciplined manner to urged the grease slicks or layer into the overflow or surface drain. Reestablishing a substantially grease free water surface, in turn, reestablishes the humidity or water vapor content of the atmosphere within the oven. The regulated and/or disciplined introduction of water into the water reservoir may continued throughout the cooking operation. Applicants contemplate that the introduction of water might be performed either in a manual or automated manner.

An example of an automated manner includes a controller having a timer in communication with at least one valve on the water supply line. The timer might then regulate the frequency and duration of the opening of the at least one valve. The timer might be mechanical, electromechanical, or electronic and the at least one valve would than be a compatible, optionally, corresponding, device.

Another example of an automated manner includes a humidity sensor within the oven and a controller in communication with the humidity sensor and the at least one valve on the water supply line. Here, the humidity sensor monitors the humidity or water vapor content within the atmosphere of the oven during a cooking operation to communicate a signal corresponding to a measured humidity value to the controller for comparison with a pre-selected humidity value. This pre-selected humidity value in one cooking operation might be a minimum humidity value while in an other cooking operation might be a maximum humidity value while in yet an other cooking operation might be both a minimum and a maximum humidity value. The pre-selected humidity value or values establish a humidity or water content operating window that is bounded by a minimum value and/or a maximum value for the atmosphere of the oven. In a case that the operating window is bounded by a minimum pre-selected humidity value, when the measured value falls below that minimum value, water is introduced into water reservoir in a manner to urge the grease from the surface of the water reservoir into the overflow or surface drain to reestablish a substantially grease free water surface.

In another aspect of the present invention, the grease/water mixture exiting the oven is diverted into a separator unit to separate the grease/water mixture into its grease component and its gray water component. The grease component is then directed to a collection vessel for subsequent appropriate disposal while the gray water is directed to a drain or a sewer.

BRIEF DESCRIPTION OF THE DRAWINGS

These and other features, aspects and advantages of the present invention will be better understood by those skilled in the art after a review of the following description, appended claims and accompanying drawings, where:

DETAILED DESCRIPTION OF A PREFERRED EMBODIMENT

Figure 1:
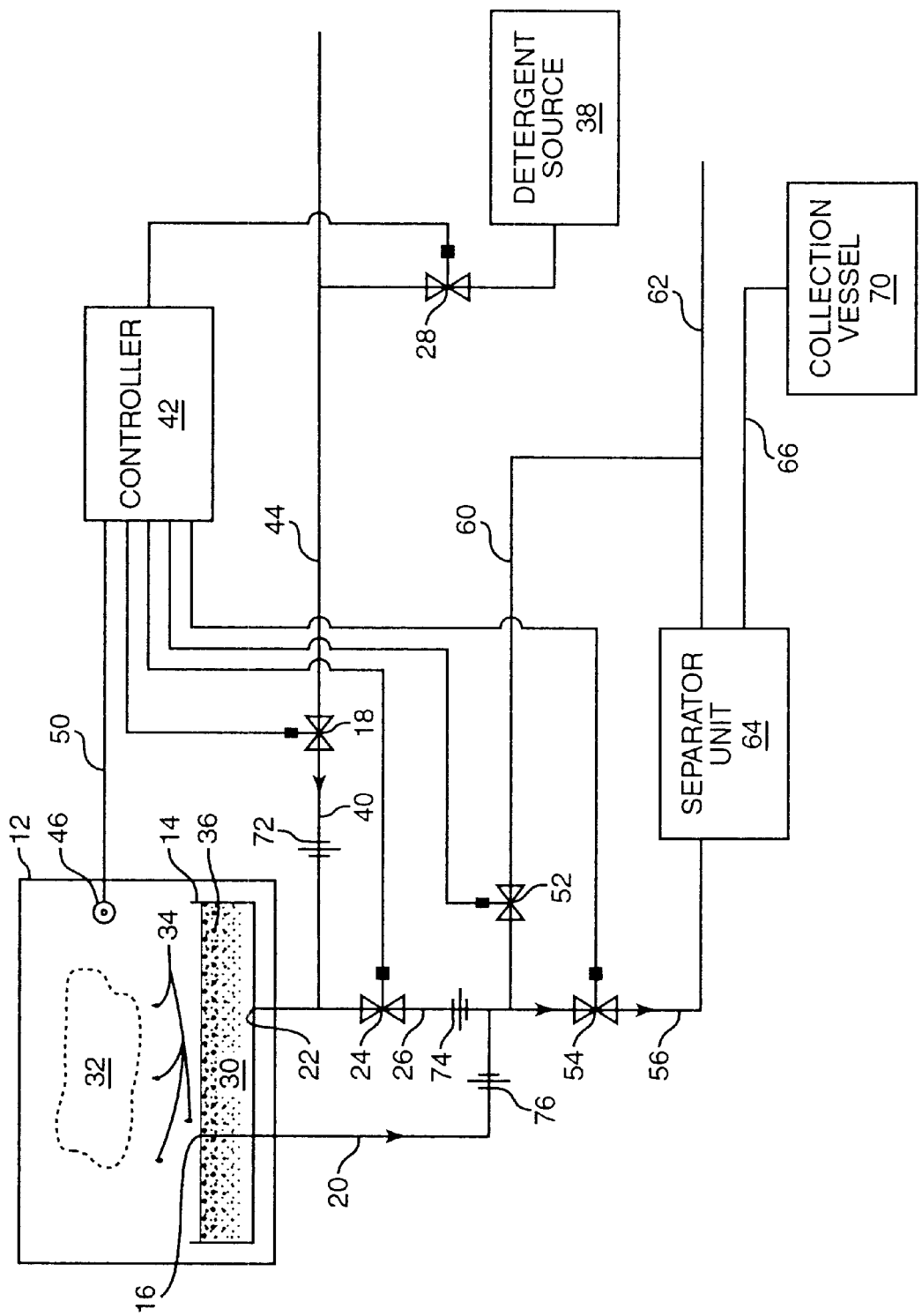
FIG. 1 depicts a schematic of the integrated system.

Depicted schematically in FIG. 1 is an embodiment of the present invention comprising an integrated system 10 comprising an oven 12 including a water reservoir 14. Within water reservoir 14 are an overflow or surface drain 16 and a bottom drain 22. Overflow or surface drain 16 is in fluid communication with an overflow/surface drain line 20. Bottom drain 22 is in fluid communication with a bottom drain line 26 through a valve 24. Valve 24 permits the isolation of drain line 26 from a water supply line 40. Water supply line 40 includes a valve 18 that may be in communication with a controller 42. Water supply line 40, overflow/surface drainline 20, and bottom drainline 20 may include connectors 72, 74 and 76 for disconnectably attaching to water source and a disposal receptacle, respectively. Examples of disconnectably attachable connectors include screw unions and quick disconnect type unions. also known as quick disconnects. In the proximity of the intersection of overflow/surface drain line 20 and bottom drain line 26 are a valve 52 and a valve 54. When open, valve 54 facilitates the transfer of fluids exiting the oven to a separator 64 by way of a separation line 56. When open, valve 52 facilitates the transfer of fluids exiting the oven to a drain or sewer line 62 by way of a bypass line 60 and, in particular when valve 54 is closed, rather than to separator 64. Applicants contemplate that separator 64 may be any one of the numerous known and/or commercially available apparatuses that separate grease/water mixtures into its components, namely, a grease component and a gray water component. The grease component is diverted through grease/oil line 66 to a collection vessel 70 for later appropriate disposition, and the gray water component that is diverted to a drain or sewer line 62 for disposal into a septic tank or a municipal sewage system.

Figure 2:
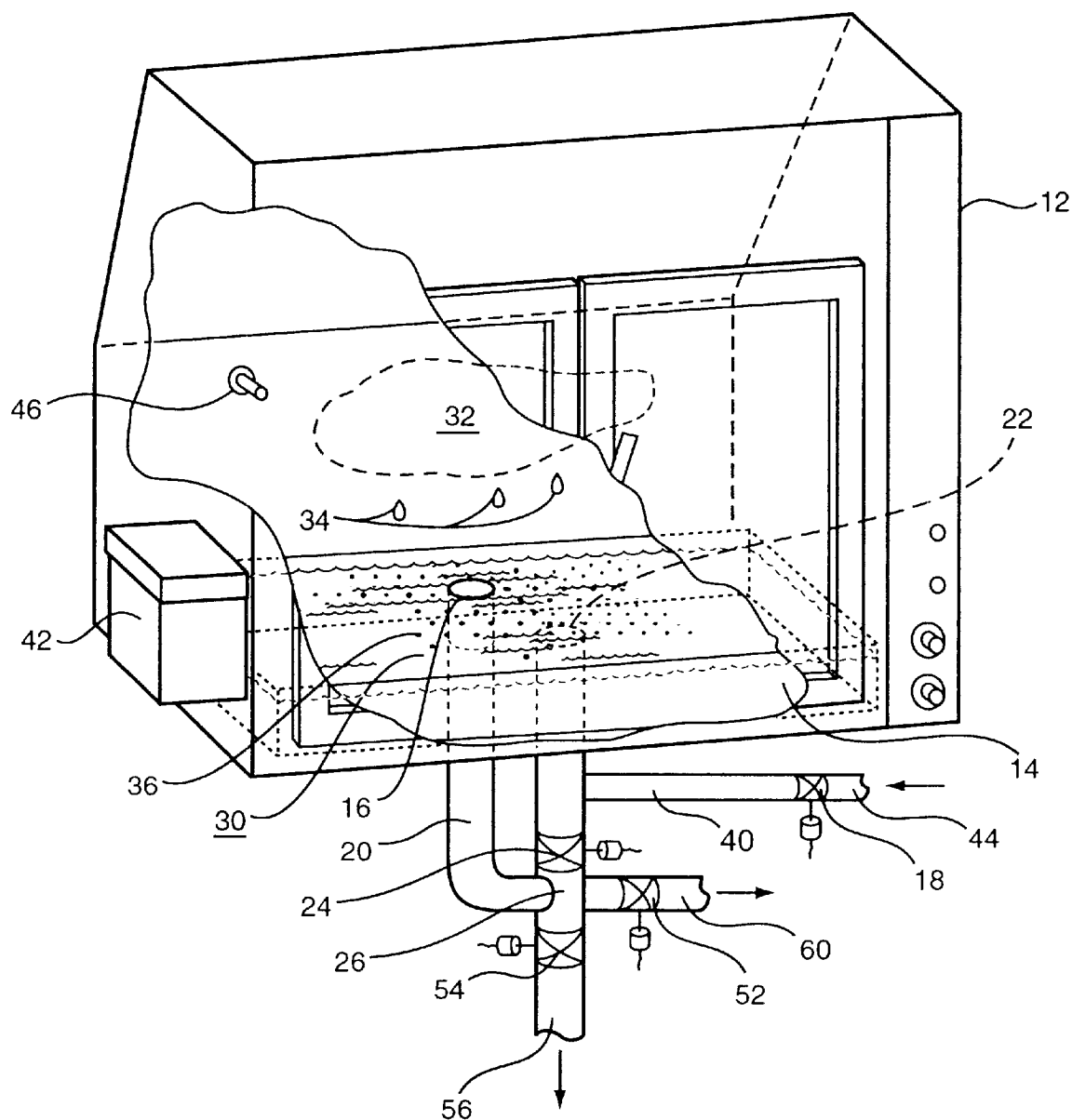
FIG. 2 depicts a cutaway perspective view of an oven including a controller with a water reservoir within the bottom of the oven.

Depicted in a cutaway perspective in FIG. 2 is an embodiment of the present invention comprising an oven including a water reservoir. The numbering in FIG. 2 corresponds to that of FIG. 1. The oven of FIG. 2 is also an element of the embodiment depicted in FIG. 1. Also, applicants contemplate yet another embodiment comprising a kit including associated mechanical, plumping, and electrical hardware that would be provided to retrofit existing ovens not having an ability to provide a consistent humidity or water vapor content to facilitate the benefits and advantages of the present invention for such ovens.

In reference to FIGS. 1 & 2, at a start, water reservoir 14 in oven 12 is empty and valves 24 and 52 are closed while valve 54 is opened. By opening valve 18, water 30 is provided to water reservoir 14 to a level predefined by the distance by which an opening of overflow or surface drain 16 extends above the bottom of water reservoir 14. As water 30 is heated, during an initial heating stage, water evaporates from a surface of water 30 to introduce humidity or water vapor into the atmosphere of oven 12. A foodstuff 32 to be cooked is placed into oven 12 during the initial heating stage or after the oven 12 has reached a pre-selected temperature.

As foodstuff 32 cooks, juices and/or grease 34 drip from foodstuff 32 and into water 30. As grease has a lower specific gravity or density than water 30, grease floats to the surface of water 30 forming isolated slicks. As additional juices and/or grease 34 drip from foodstuff 32, the slicks grow over the surface of water 30 to an extent to substantially form a grease layer 36. The grease layer 36 becomes a barrier to the formation of water vapor directly from the surface of water 30. Water apparently diffuses too slowly through grease layer 36 to sustain the humidity or water vapor content of the atmosphere of the oven 12. As a result the relative humidity drops and the beneficial results of elevated humidity are lost. The foodstuff being cooked can dry excessively. To reestablish the humidity or water vapor content of the atmosphere of the oven 12, valve 18 in water supply line 40 is opened to introduce additional water into water reservoir 14. The introduction of water into reservoir 14 raises the water level to cause an overflow to drain 16. The grease slicks or layer 36 migrate into the overflow or surface drain 16; down overflow/drain line 20 and eventually to separator unit 64. With the surface of water 30 renewed, the humidity or water vapor content of the atmosphere of oven 12 is reestablished. The renewal or refreshment of the surface of water 30 may be done in a manual and/or automated manner.

Although overflow or surface drain 16 is depicted in FIGS. 1 & 2 as a pipe extending through the bottom of water reservoir 14, it will be appreciated by those skilled in the art that overflow or surface drain 16 may be of any form or configuration that facilitates the removal of grease slicks or layer 36 from the surface of water 30. A cross section of overflow or surface drain 16 might be any that does not interfere with its function including regular, irregular, and/or smooth as well as more traditional cross sections such as circular, rectangular, elliptical or oval. In regard to a rectangular cross section, overflow or surface drain might have the form of a trough, for example, extending the depth of the oven 12. In an alternative approach, the overflow or surface drain may might be defined by, or at, the perimeter of water reservoir 14 rather than extending up through its bottom. In this way, as additional water is introduced to water reservoir 14, the grease slicks or layer 36 might be urged toward the perimeter of water reservoir 14 to refresh the surface of water 30.

Although water supply line 40 is depicted in FIGS. 1 & 2 as being in fluid communication with bottom drain 22, it will be appreciated by those skilled in the art that water supply line 40 may be of any form or configuration of fluid communication that facilitates the removal of grease slicks or layer 36 from the surface of water 30. That is, water supply line 40 might be in direct fluid communication with water reservoir 14 rather than through bottom drain 22. Alternatively, water supply line 40 might be in direct fluid communication with water reservoir 14 through multiple orifices or nozzles that are arranged in a pattern or patterns so that when water passes into water reservoir 14 grease slicks or layer 36 are urged to the opening or openings of overflow or surface drain 16. Further, the water supplied through water supply line 40 and/or water supply line may be heated by an appropriate means so that the thermal inertia of oven 12 is substantially unchanged. Alternatively, the volume of water introduced to water reservoir 14 may be such that the grease slicks or layer 36 are substantially removed while the temperature of water 30 and humidity or water vapor content remain substantially unchanged. Furthermore, the water reservoir may include a supplemental heater and/or even a cooler to facilitate the regulation of the temperature of water 30 and, thus. the humidity or water content of atmosphere independent of the temperature of oven 30. In particular, the water supply line and bottom drain can be provided as separate lines.

At the end of a cooking operation, oven 12 is cleaned. FIG. 1 depicts a detergent source 38 in fluid communication through valve 28 to water supply line 40. The cleaning might be at the cooking temperature, a temperature above the cooking temperature, and/or room temperature. That notwithstanding, water 30 may now be drained from water reservoir 14 by maintaining valve 18 closed while opening valve 24. Valve 24 may then be closed and both valve 18 and valve 28 opened to introduce a detergent containing water into water reservoir 14 to begin cleaning. Alternatively, before water reservoir 14 is drained, both valve 18 and valve 28 may be opened to introduce a detergent containing water into water reservoir 14 so as to urge water 30 into overflow or surface drain 16 to begin cleaning. In another alternative. valve 24 is opened while valve 18 is closed and the water 30 is drained. After draining, one manually cleans the oven including the empty reservoir 14. Such an operation may be mechanized such that a light in controller 42 signals the end of the cleaning cycle. In yet another alternative, the microprocessor of controller 42 is used for controlling the cleaning cycle. In any case, after water reservoir 14 is clean, valve 28 may be closed to introduce detergent-free water into water reservoir 14 for rinsing.

It will be appreciated by those skilled in the art that numerous variation and/or combinations for cleaning not only water reservoir 14, but also oven 12 exist. Applicants contemplate that the numerous variation and/or combinations for cleaning are part of the present invention. The rinsing fluids, or any fluids for that matter, that flow from overflow or surface drain 16 through drain line 20 or bottom drain 22 through valve 24 may be directed through to bypass line 60 by closing valve 54 and valve 52. However, in the situation where there is a substantial amount of grease still within the fluid coming through either of drain line 20 and/or drain line 26, it is preferred to divert that fluid to separator 64 via separator line 56.

Valves 18, 24, 28, 52, and 54 may be manual, mechanized, even remotely actuated, and any combination of the preceding. If any valves 18, 24, 28, 52, and 54 are remotely actuated, then those that are may be in communication (e.g., fluid, mechanical, electrical, electromechanical, and combinations of any of the preceding) with a corresponding controller 42 such as a programmable logic controller as depicted schematically in FIG. 1. The implementation and communication of the various types of valves and controller to achieve the effect of the embodiments of the present invention will be appreciated by those skilled skilled in the art.

In a preferred embodiment, controller 42 communicates with at least one valve, namely, valve 18 that controls the flow of water through water supply line 40 to water reservoir 14. Controller 42 may include a timer such as a mechanical, an electromechanical, or an electronic timer circuit to control the actuation of at least one valve 18. For example, at the start of a cooking operation, valve 18 is opened to fill water reservoir 14 with water 30. After oven 12 is heated and a foodstuff 32 is placed within the oven, the controller timing circuit opens valve 18 on water supply line 40 at regular intervals, such as, for example, about every hour, and provides water for a time sufficient, such as, for example, about a tenth of an hour, to urge any grease slicks or layer 36 on the surface of water 30 into the opening of overflow or surface drain 16, thereby refreshing the surface and reestablishing the humidity or water content of the atmosphere of the oven.

In an alternative embodiment, rather than or in addition to the timer circuit, controller 42 may include a comparator circuit that is in electrical communication through, for example, a line 50, with a humidity sensor 46 in addition being in communication with the at least one valve 18. Here, the humidity sensor 46 monitors the humidity or water vapor content within the atmosphere of the oven 12 during a cooking operation to communicate a signal corresponding to measured humidity value to the controller 42 for comparison with a pre-selected humidity value or values. The pre-selected selected humidity value in one cooking operation might be a minimum humidity value while in an other cooking operation might be a maximum humidity value while in yet an other cooking operation might be both a minimum and a maximum humidity value. Further, the pre-selected humidity value or values establish a humidity or water content operating window that is bounded by a minimum value and/or a maximum value for the atmosphere of the oven 12 and will be a function of the character of foodstuff 32. For example, if the foodstuff 32 is a fowl, such as, for example, dove, quail, grouse, chicken, duck, goose, turkey, or pheasant, the lower humidity level would be set to maintain the moistness of the fowl when cooked to completeness. Further, this level could be different based upon the size of the fowl, e.g., dove versus turkey. Furthermore, this level could be different based upon the source of the fowl, e.g., wild turkey versus farm raised turkey. Applicants contemplate that other foodstuffs might be prepared using the present invention, such as, for example, beef including veal, venison, buffalo, rhea, ostrich, emu, pork, lamb, and dog as, for example, a roast, ground meat, ribs, steaks, shish kebab, and leg.

In a case that the humidity or water vapor content operating window is bounded by a minimum pre-selected humidity value, when the measured humidity value falls below that minimum value, controller 42 sends a signal to open valve 18 to introduce additional water through water supply line 40 into the water reservoir 14. In this manner the grease slicks or layer 36 is urged from the surface of the water reservoir 14 into the overflow or surface drain 16 to reestablish a substantially grease free water surface on water 30.

Figure 3:
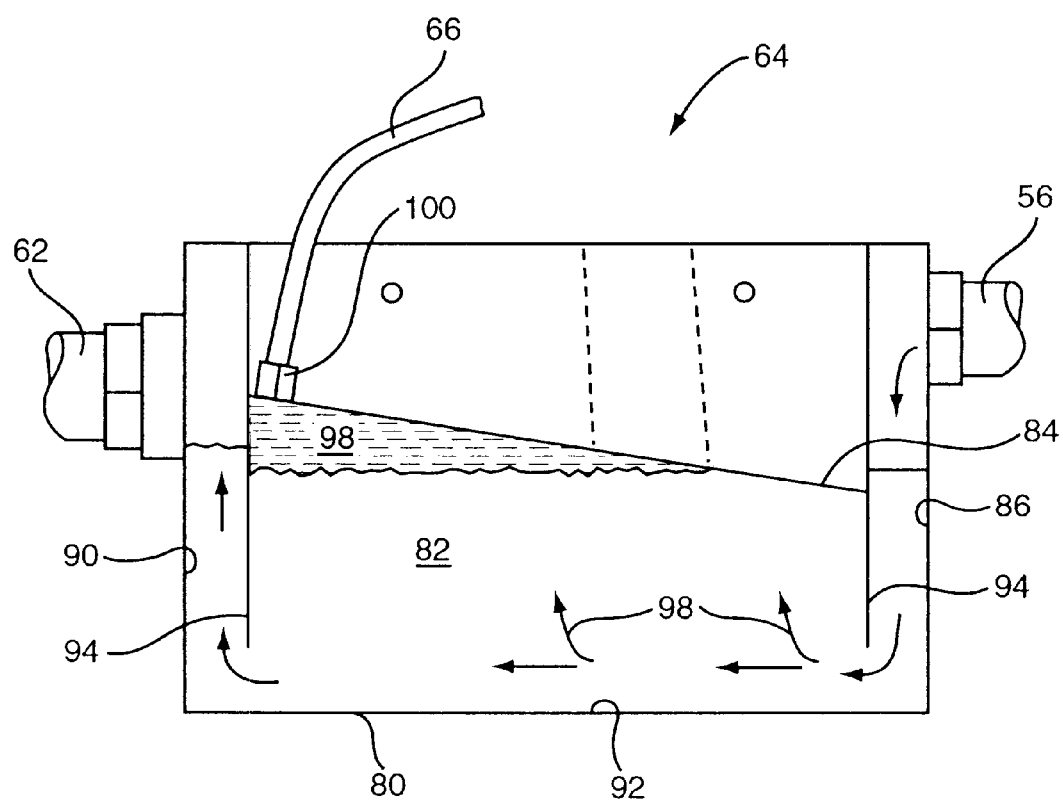
FIG. 3 depicts a cross sectional schematic of a separator unit with a readily serviceable focusing plate.

In regard to separator unit 64, numerous commercial separators are available. For example, the Big Dipper® separator available from Thermaco, Inc. of Asheboro, N.C., may be suitable. Further, the separator described in U.S. patent application Ser. No. 09/439,900, filed on the same day as the present application, entitled "Readily Serviceable Separator Unit with Focusing Plate," invented by W. C. Batten and B. W. Kyles and assigned to Thermaco, Inc., Asheboro, N.C., may be suitable. This separator unit 64, schematically depicted in cross-section in FIG. 3, includes a vessel 80 containing a separation or segregation volume 82 and a removable focusing plate 84 situated above the separation or segregation volume 82. The vessel 80 of the separator unit 64 includes an inlet end 86 and an outlet end 90 connected by a bottom 92 and sidewalls 94. At each of the inlet 86 and outlet ends 90 there are baffles 94 creating inlet and outlet channels as well as defining the separating or segregation volume 82. The upper portion of the separation or segregating volume 82 is bounded by the focusing plate 84 placed within the vessel 80 and between the baffles 94 and sidewalls 96 of the vessel 80. The focusing plate 84 guides a component of the immiscible or insoluble fluid mixture having a lower specific gravity or density 98 toward an access port 100. The component having the lower specific gravity or density 98 is removed from the region proximate to the access port, through an access line 66 after a sufficient quantity has accumulated. The simplicity of the separator unit 64 adds to its serviceability. That is, removably fastening of the focusing plate 84 within the vessel simplifies the plate's insertion and removal for the frequent and unencumbered service of the separator unit without the need for special tools or inordinate amounts of down time.

Furthermore, the separator described in U.S. patent application Ser. No. 09/439,5742, filed on the same day as the present application, entitled "Combination Pump and Separator, Especially for Commercial Kitchens," invented by W. C. Batten, and assigned to Thermaco, Inc., Asheboro, N.C., based on Provisional Patent Application No. 60/135,033, filed May 20, 1999, having the same title and inventors may be suitable. This application is now U.S. Pat. No. 6,261,462. Thus, it will be appreciated by those skilled in the art that any separator that is effective in separating a grease/water mixture into a grease component and a gray water component may be used in the integrated system embodiment of the present invention. Included among such systems are those disclosed in U.S. Pat. No. 5,861,098, issued Jan. 19, 1999, in the name of Morrison, assigned on its face to MDK Enterprises, Inc., and entitled "Apparatus and Method for removing Grease from Drain Water in Restaurant Operations;" U.S. Pat. No. 5,705,055, issued Jan. 6, 1998, in the names of Holloway et al., assigned on its face to Josam Company, and entitled "Apparatus for Automatically Recovering Grease from a Grease Separator;" U.S. Pat. No. 5,492,619, issued Feb. 20, 1996, to Batten, assigned on its face to Clearline Systems, Inc., and entitled "Automatic Grease Collection System;" U.S. Pat. No. 4,554,074, issued Nov. 19, 1985, to Broughton, and entitled "Separator for immiscible Fluid Mixture;" U.S. Pat. No. 4,400,274, issued Aug. 23, 1983, to Protos, and entitled "Separator;" U.S. Pat. No. 4,149,973, issued Apr. 17, 1979, to Harris, and entitled "Horizontal Separator;" U.S. Pat. No. 1,864,511, issued Jun. 21, 1932, to Jones, assigned on its face to the Sharpies Specialty Company, and entitled "Method and Apparatus for Separating Immiscible Substances;" and U.S. Pat. No. 1,200,951, issued Oct. 10, 1916, to Kelley, Jr., assigned on its face to Kelly Separator Company, and entitled "Separator."

The previously described version of the present invention may have many advantages, including allowing the establishment and maintenance of a constant humidity or water vapor content within an atmosphere of an oven that uses moisture as a supplemental or primary cooking media. Additionally, the present invention is advantageous for use in ovens to establishment and maintain humidity or water vapor content within an atmosphere of an oven to assure that a foodstuff cooked therein is neither too dry nor too moist. Further, the present invention is advantageous for providing a kit that may be used to retrofit an oven, whether it heats a foodstuff by radiation such as conventional radiation and/or microwave radiation, convection, and combinations thereof.

Although the present invention has been described in considerable detail with respect to certain preferred versions thereof, other versions are possible. Examples include the use of and/or inclusion within the integrated system of an oven or cooking operation as described in U.S. Pat. No. 5,584,236, issued Dec. 17, 1996, to Margolis, and entitled "Fat Removal Draining System and Method;" U.S. Pat. No. 5,191,831, issued Mar. 9, 1993, to Walden, and entitled "Oven with Water Ring Assembly;" U.S. Pat. No. 5,184,540, issued Feb. 9, 1993, to Riccio, and entitled "Cooking Apparatus with Rotisserie and a Reclamation Trap;" U.S. Pat. No. 5,101,714, issued Apr. 7, 1992, to Grandi, and entitled "Universal Cooking and Baking Apparatus;" U.S.

Pat. No. 5,083,505, issued Jan. 28, 1992, to Kohlstrung et al., assigned on its face to LechMetall Landsberg GmbH, and entitled "Cooking Apparatus;" U.S. Pat. No. 4,924,072, to Oslin, assigned on its face to Delaware Capital Formation, Inc., and entitled "Humidity Control for Oven Chamber;" U.S. Pat. No. 4,920,948, issued May 1, 1990, to Koether et al., assigned on its face to Micro-Technology Licensing Corporation, and entitled "Parameter Control System for an Oven;" U.S. Pat. No. 4,876,426, issued Oct. 24, 1989, to Smith, and entitled "Method and Apparatus for Water Vapor control in Convection Ovens;" U.S. Pat. No. 4,506,598, issued Mar. 26, 1985, to Meister, and entitled "Apparatus for the Heating of Foodstuffs by Means of a Steam-Air Mixture;" U.S. Pat. No. 4,084,492, issued Apr. 18, 1978, to Sullivan, assigned on its face to KFC Corporation, and entitled "System for Providing like cooking Medium Volume in Successive Cooking Cycles;" U.S. Pat. No. 3,744,474, issued July 1973, to Shaw, assigned on its face to Beatrice Foods Co., and entitled "Steam Cooking Apparatus and Method;" and U.S. Pat. No. 2,097,793, issued Jul. 9, 1934, to Howel, and entitled "Means for Cooking." Therefore, the spirit and scope of the appended claim should not be limited to the description of the preferred versions herein.

All patents and other documents identified in the present application are hereby incorporated by a reference.

We claim:

1. An integrated system for maintaining a water vapor content within an oven and separating a grease/water mixture exiting the oven into a grease component and a gray water component to reduce or eliminate the direct disposal of grease into a drain or sewer line; the integrated system comprising:
    (a) an oven including a water vapor source comprising a water reservoir having a surface drain:
    (b) a water supply line for providing water to and in fluid communication with the water reservoir;
    (c) at least one valve in the water supply line for controlling the providing of water;
    (d) at least one reservoir drain line for transmitting the grease/water mixture exiting the oven and in fluid communication with at least the surface drain;
    (e) a separator unit for segregating the grease/water mixture transmitted from the at least one reservoir line to the separator unit into the grease component and the gray water component, the separator unit including a grease component line for transmitting the grease component exiting the separator unit and a gray water component line for transmitting the gray water component exiting the separator unit; and
    (f) a collection vessel in fluid communication with the separator unit and for storing the grease component transmitted from the separator unit.

2. An integrated system according to claim 1, wherein the at least one valve comprises a remotely actuatable valve and further comprising a controller in communication with at least the at least one valve to facilitate actuation.

3. An integrated system according to claim 2, further comprising a humidity sensor in electrical communication with the controller and the remotely actuatable valve in electrical communication with the controller, wherein, the humidity sensor measures a value corresponding to a water vapor content of the oven and relays the measured value to the controller for comparison with a stored value corresponding to a desired water vapor content for the oven to determine if the at least one valve is to be actuated.

4. An integrated system according to claim 3, wherein the stored value corresponds to a minimum desired water vapor content for the oven.

5. An integrated system according to claim 2, wherein the controller further comprises a timer circuit that is used to specify a frequency and a duration for actuating the at least one valve to introduce water into the reservoir.

6. An integrated system according to claim 1, wherein the oven comprises at least one of a rotisserie, a combination oven, and a smoking oven.

7. An integrated system according to claim 1, further comprising a bottom drain in the reservoir and a bottom drain line for providing fluid communication between the bottom drain and the separator unit.

8. An integrated system according to claim 7, further comprising a bypass line in fluid communication with the at least one reservoir drain line and the bottom drain line and for bypassing the separator unit.

9. An integrated system according to claim 1, wherein the separator unit comprises a readily serviceable separator with a focusing plate.

10. An integrated system according to claim 2, further comprise at least one additional valve and at least one further valve, both in communication with the controller.

11. An integrated system according to claim 1, wherein the water supply line is in detachable communication with the reservoir.

12. An integrated system according to claim 11, wherein the detachable communication comprises a quick type disconnect.

13. An integrated system according to claim 11, wherein the detachable communication comprises a union.

14. An oven for moisturizing a foodstuff during cooking, the oven comprising:
    (a) a chamber;
    (b) a reservoir in communication within the chamber for a water vapor source, the reservoir including an overflow or surface drain and a bottom drain;
    (c) an overflow/surface drainline in contacting communication with the overflow or surface drain;
    (d) a bottom drainline in contacting communication with the bottom drain;
    (e) a water supply line including at least one valve, the water supply line in fluid communication with the reservoir; and
    (f) a controller in communication with the at least one valve included in the water supply line; wherein, a surface of the reservoir is refreshed by the circuit of the controller opening the at least one valve for a preselected time.

15. An oven according to claim 14, the oven comprising a rotisserie oven.

16. An oven according to claim 14, the oven comprising a combination oven.

17. An oven according to claim 14, the oven comprising a smoker oven.

18. An oven according to claim 14, wherein, the overflow/ surface drain line, the bottom drain line, and the water supply line, are detachably connectable to a drain and a water sewer respectively.

19. An oven according to claim 18, wherein, the detachable connection includes a quick disconnect.

20. An oven according to claim 18, wherein the detachable connection comprises a union.

21. An oven according to claim 14, further comprising a humidity sensor within the chamber.

22. An oven according to claim 14, wherein, the circuit of controller comprises an electronic timer circuit.

23. An oven according to claim 14, wherein, the circuit of controller comprises an electromechanical timer circuit.

24. An oven according to claim 21, wherein, the circuit of the controller comprises a comparator circuit.

25. An oven according to claim 1. further comprising a detergent source in fluid communication with the water supply line.

* * * * *